US008820267B2

(12) United States Patent
Stapel et al.

(10) Patent No.: US 8,820,267 B2
(45) Date of Patent: Sep. 2, 2014

(54) DEVICE FOR REMOVING MANURE FROM A FLOOR

(75) Inventors: Roelof Stapel, Lelystad (NL); Karel Van Den Berg, Bleskensgraaf (NL)

(73) Assignee: Lely Patent N.V., Maassluis (NL)

( * ) Notice: Subject to any disclaimer, the term of this patent is extended or adjusted under 35 U.S.C. 154(b) by 114 days.

(21) Appl. No.: 13/211,345

(22) Filed: Aug. 17, 2011

(65) Prior Publication Data

US 2011/0297099 A1    Dec. 8, 2011

Related U.S. Application Data

(63) Continuation of application No. PCT/NL2010/000024, filed on Feb. 12, 2010.

(30) Foreign Application Priority Data

Feb. 17, 2009 (NL) ...................................... 1036582

(51) Int. Cl.
    *A01K 1/01*        (2006.01)
(52) U.S. Cl.
    USPC ........................................................ 119/451
(58) Field of Classification Search
    USPC .................... 119/451; 15/236.01, 49
    See application file for complete search history.

(56) References Cited

U.S. PATENT DOCUMENTS

| 3,409,120 | A | * | 11/1968 | Van Huis | 198/746 |
| 2,966,256 | A | | 12/1970 | McLeland | |
| 3,960,110 | A | * | 6/1976 | Laurenz | 119/451 |
| 4,123,992 | A | * | 11/1978 | Laurenz | 119/451 |
| 4,787,338 | A | * | 11/1988 | Stanley et al. | 119/451 |
| 5,740,763 | A | * | 4/1998 | Hollingsworth | 119/442 |
| 6,446,298 | B1 | * | 9/2002 | Berg et al. | 15/93.1 |
| 6,698,383 | B1 | * | 3/2004 | Terwort et al. | 119/451 |
| 6,763,782 | B1 | * | 7/2004 | Kordelin | 119/166 |
| 7,032,682 | B2 | * | 4/2006 | Berg | 172/5 |
| 7,047,905 | B1 | * | 5/2006 | Brade | 119/442 |
| 7,401,575 | B2 | * | 7/2008 | Waybright | 119/451 |
| 8,201,299 | B2 | * | 6/2012 | Dondi et al. | 15/179 |
| 8,214,964 | B1 | * | 7/2012 | Coleman | 15/236.05 |

FOREIGN PATENT DOCUMENTS

| DE | 20309156 U1 | 11/2003 |
| DE | 202006007378 U1 | 8/2006 |
| EP | 1690450 A1 | 8/2006 |

OTHER PUBLICATIONS

International Search Report issued on Apr. 13, 2010.

* cited by examiner

*Primary Examiner* — Yvonne Abbott
(74) *Attorney, Agent, or Firm* — Hoyng Monegier LLP; Minerva Rivero; David P. Owen (57) ABSTRACT

The present invention relates to a device for removing manure present on a floor, including a frame, a drive for moving the device over the floor and at least one manure slide which has an upper edge, wherein the manure slide is held by the frame by means of a connection structure, wherein the connection structure includes a first rotational connection with a first substantially horizontal rotational centre line which is located below at least a portion of the upper edge of a manure-pushing wall portion of the manure slide.

33 Claims, 6 Drawing Sheets

DEVICE FOR REMOVING MANURE FROM A FLOOR

CROSS REFERENCE TO RELATED APPLICATIONS

This is a continuation of PCT/NL2010/000024 filed on 12 Feb. 2010, which claims priority from Netherlands patent application no. 1036582 filed 17 Feb. 2009, the contents of both applications are hereby incorporated by reference in their entireties.

BACKGROUND OF THE INVENTION

1. Field of the Invention

The invention relates to a device for removing manure present on a floor, in particular a passageway for animals, such as cattle. By manure is also meant other material, such as feed residues, which has to be removed from a floor, in particular with the aid of one or more slides which are able to push the material towards a delivery location.

2. Background of Related Art

DE 103 09 106 shows a trolley with a manure slide arrangement to be driven and steered by a person who has taken his position on the device, which manure slide arrangement is provided with two manure sliding walls which are located behind each other and which are fastened to a horizontal plate which defines a chamber with the sliding walls. The plate is fastened to the frame of the trolley by means of a parallelogram connection comprising upwardly and forwardly extending link rods, in order to be able to swivel upwards, with the sliding walls, in a vertical longitudinal plane of the trolley, in order to avoid a threshold or other obstacle. The known trolley is also provided with a mechanism for pre-setting the vertical position of the plate and thereby of the sliding walls.

SUMMARY OF THE INVENTION

One or more of the aforementioned disadvantages is overcome by a device for removing manure present on a floor comprising a manure slide according to the present invention, where the manure slide is able to have, in many circumstances, an effective contact with the floor.

According to various aspects of the present invention, a device for removing manure present on a floor, comprises a frame, a drive for moving the device over the floor and at least one manure slide which has an upper edge, wherein the manure slide is held by the frame by means of a connection structure, wherein the connection structure comprises a first rotational connection with a first substantially horizontal rotational centre line which is located below at least a portion of the upper edge of a manure-pushing wall portion of the manure slide.

Hereby, while maintaining the rotatability, a low point of rotation is obtained, as a result of which the vertical moment arm of horizontal forces exerted on the manure slide, such as by the contact between floor and slide, is kept limited, and therewith a possibly occurring moment tending to lifting of the slide. Substantially horizontal for the first rotational centre line also relates to rotational centre lines which are at a small angle to the horizontal, such as for example an angle of approximately 20 degrees.

In such an arrangement, the connection structure can comprise a second rotational connection with a second, substantially horizontal rotational centre line which is at an angle, of preferably approximately 90 degrees, to the first rotational centre line, so that adjustment to local changes in a direction transverse thereto is improved. The second rotational centre line is preferably also located below at least a portion of the upper edge of a manure-pushing wall portion of the manure slide.

It is observed that from EP 1.690.450, which is hereby incorporated by reference in its entirety, a self-propelled trolley with a single manure slide (scraper) is known, in which the manure slide is suspended at a location in front of the manure slide from a frame in such a manner that the slide is rotatable about a horizontal rotational centre line which is parallel to the direction of travel, for adjustment to local changes in the floor profile. The slide can also be suspended in such a manner that it can pivot about a rotational centre line perpendicular to the aforementioned rotational centre line, for example by means of a drawbar, a parallelogram construction or in general by means of two hinges. Both rotational movements take place about centre lines located above the upper edge of manure-pushing wall portions of the manure slide.

The first rotational centre line can be transverse to a vertical central longitudinal plane of the device. The second rotational centre line can then be located in that plane.

In one embodiment, the location of the manure slide with respect to the first rotational centre line, in particular the horizontal distance, can be set. Hereby, the moment arm between manure slide and rotational centre line can be determined.

In another embodiment, the manure slide is substantially U-shaped or V-shaped in order to define a manure-accommodating-space which opens in forward direction. In a compact embodiment, the first rotational centre line is then preferably located in front of a rear wall of the manure-accommodating-space, and preferably coincides in horizontal direction with the manure-accommodating-space, when viewed in projection on a vertical central longitudinal plane of the device. The moment generated by the frictional force in one or more planes parallel to the vertical central longitudinal plane, by which moment the pressure of the rear wall of the manure slide could otherwise be reduced, can then be kept limited.

In a further embodiment, the manure slide has two legs which have a length in the order of magnitude of the width of the rear wall of the manure slide.

In another embodiment, the first rotational centre line is located behind the manure slide. Hereby, the forces exerted on the manure slide by the manure and the floor can improve the contact of manure slide with floor, however without that pressure may become too great and would hinder the travelling.

The manure slide can then be mounted on a, for example plate-shaped, holder and be movable therewith respect to the frame as a unit about the first and, if present, the second rotational centre line, wherein the holder is provided with an added floor-treating member which is located in longitudinal direction at a distance from the manure slide, preferably therebehind. The added floor-treating member, which can be configured for a comparable function (manure slide) or for another function, such as sweeping or brushing, is preferably located behind the manure slide, to improve the stability. The added floor-treating member can form an upright pushing or sweeping strip which extends substantially in transverse direction, for example a brush by means of which a possible manure film layer is detached.

In one embodiment, the manure slide and the added floor-treating member are located on both sides of the first rotational centre line, so that there is obtained an arrangement which is compact in longitudinal direction. In this embodiment, a settability of the distance, in particular the horizontal distance, to the first rotational centre line of the manure slide and/or the added floor-treating member is favourable, because the abutment pressures of both of them can be set according to one's wishes, in particular if a part of the mass of the device is transferred, via the connection of the first rotational centre line, via the holder, to the floor. In another embodiment, in which the position of the holder itself is set with respect to the frame, displacement of the holder for that setting will result in an increased moment arm for one of them (for example the manure slide) and a decreased moment arm for the other one (for example the added floor-treating member), with respect to the first rotational centre line.

The front floor contact points of the manure slide, when viewed in longitudinal direction, can be located closer to the first rotational centre line than the rear floor contact points of the added floor-treating member. In a further embodiment thereof, the ratio of the distances in longitudinal direction between the front floor contact points of the manure slide and the first rotational centre line and the rear floor contact points of the added floor-treating member and the first rotational centre line amounts to approximately 1 to 2.

The stability in longitudinal direction is improved if the manure slide, the holder and the added floor-treating member, when viewed in a vertical longitudinal plane of the device, form a rigid unit.

The adjustment to the surface of the floor is improved if the manure slide and the added floor-treating member are rotatable with respect to each other about a rotational centre line which extends parallel to the longitudinal direction, so that, for example, one can assume an oblique position and the other one a purely horizontal position. That rotational centre line can coincide with the aforementioned second rotational centre line.

In a further embodiment, the manure slide, the holder and the added floor-treating member, when viewed in a vertical plane perpendicular to a vertical longitudinal plane of the device, form a rigid unit.

In yet a further embodiment, a device for removing material, such as manure, present on a floor, comprises a frame, a drive for moving the device over the floor and a first and a second floor-treating member, wherein the two floor-treating members extend substantially over the width of the device and are mounted on a holder, which is held by the frame by means of a connection structure, wherein the first and the second floor-treating member are located in longitudinal direction at a distance from each other, wherein the connection structure comprises a first rotational connection with a first, substantially horizontal rotational centre line, about which the holder with the two floor-treating members is rotatable with respect to the frame, while changing the orientation of the holder in a vertical longitudinal plane of the device, the first rotational centre line being substantially transverse to said longitudinal plane.

The floor-treating members can be designed differently, wherein the front, first floor-treating member is in particular designed as a (manure) slide. The second floor-treating member can then in particular form a second slide or a brush.

The holder with the two floor-treating members can be connected to the device for rotation with respect thereto about a second rotational centre line which is substantially parallel to the vertical longitudinal plane.

As mentioned above, the holder with the two floor-treating members can be rotatable as a rigid unit about the first rotational centre line and/or the second rotational centre line.

The developments of the arrangement comprising holder with manure slide and floor-treating member described in the foregoing can also be applicable here. In one embodiment, the manure slide and/or the added floor-treating member are/is concave, preferably with the hollow side oriented forwardly.

In the case of an embodiment of a floor-treating member as a brush, the latter can be stationary and comprise a series of brush bristles which are juxtaposed substantially in transverse direction, such as customary per se for a brush.

For removing manure residues deposited in transverse slots of a so-called slatted floor, the brush can comprise brush bristles of at least two different lengths, wherein longer brush bristles are bendable and extend further downwards than shorter brush bristles. The longer brush bristles can then extend into the slots in order to detach the manure residues, whereafter these residues can drop into the manure pit located therebelow. Shorter brush bristles can be present in greater number than longer brush bristles, wherein the longer brush bristles are preferably provided at a mutual distance from each other along the brush of a plurality of brush bristles. If the brush is concave in top view, the series of brush bristles will comprise trajectories which are at an angle to the transverse slots. The longer brush bristles can then be influenced in their movement by juxtaposed brush bristles in such a manner that said movement obtains a transverse component by which the cleaning effect is enhanced.

In yet another embodiment, a device for sweeping a stable floor, comprises a frame and a brush for sweeping contact with the floor, wherein the brush comprises a series of brush bristles which are juxtaposed substantially in transverse direction, and the brush is concave in top view, preferably with the hollow side oriented forwardly. The brush can comprise brush bristles of at least two different lengths, wherein longer brush bristles are bendable and extend further downwards than shorter brush bristles. Also in this case, shorter brush bristles can advantageously be present in greater number than longer brush bristles, wherein the longer brush bristles are preferably provided at a mutual distance from each other along the brush of a plurality of brush bristles.

In a further embodiment, the invention provides a device for removing material from a stable floor, wherein the device comprises a frame and a slide for the material, which slide is connected to the frame and has a lower edge for sliding contact with the stable floor, wherein the lower edge is located in a first horizontal plane, wherein the device is further provided with stationary, bendable brush bristles which extend downwards up to a distance below the first horizontal plane. These lengthwise extending brush bristles can extend into the slots in order to detach the manure residues, whereafter these residues can drop into the manure pit located therebelow. As mentioned above, they can form part of a brush which is for the remaining provided with shorter bristles, which rest on the floor or are added to another floor-treating member, such as the aforementioned manure slide or an additional manure slide. They can also be located, for example, between two floor-treating members, such as two manure slides.

In another embodiment, the invention provides a device for removing material, such as manure, present on a floor, comprising a frame, a drive for moving the device over the floor and at least one manure slide which has an upper edge, wherein the manure slide is held by the frame by means of a connection structure, wherein the connection structure comprises a first rotational connection with a first substantially horizontal rotational centre line which is located behind the manure slide. As already mentioned, the first rotational centre line can be located below at least a portion of the upper edge of a manure-pushing wall portion of the manure slide.

The above-mentioned device can be configured for unmanned self-propelling and preferably also for unmanned steering. One of ordinary skill in the art will appreciate that any suitable self-propelling and unmanned steering mechanism for manure removal devices may be known. Further, one of ordinary skill in the art will appreciate that by unmanned self-propelled and self-steering device are meant both at least substantially autonomously travelling and steering devices, whether or not programmed for this purpose, such as the Discovery (registered trademark) manure slide of the registered trademark Lely, and devices in which the travelling and/or steering are/is remotely controlled. In both cases, a motor for the travelling of the device is provided in the device.

The invention furthermore provides an assembly of a device according to the invention and a floor. The floor can have a closed upper surface or be provided with slots and/or form a passageway in a stable.

BRIEF DESCRIPTION OF THE FIGURES

The invention will be explained with reference to a number of illustrative embodiments shown in the accompanying figures, in which.

DETAILED DESCRIPTION OF ILLUSTRATIVE EMBODIMENTS

Figure 1A:
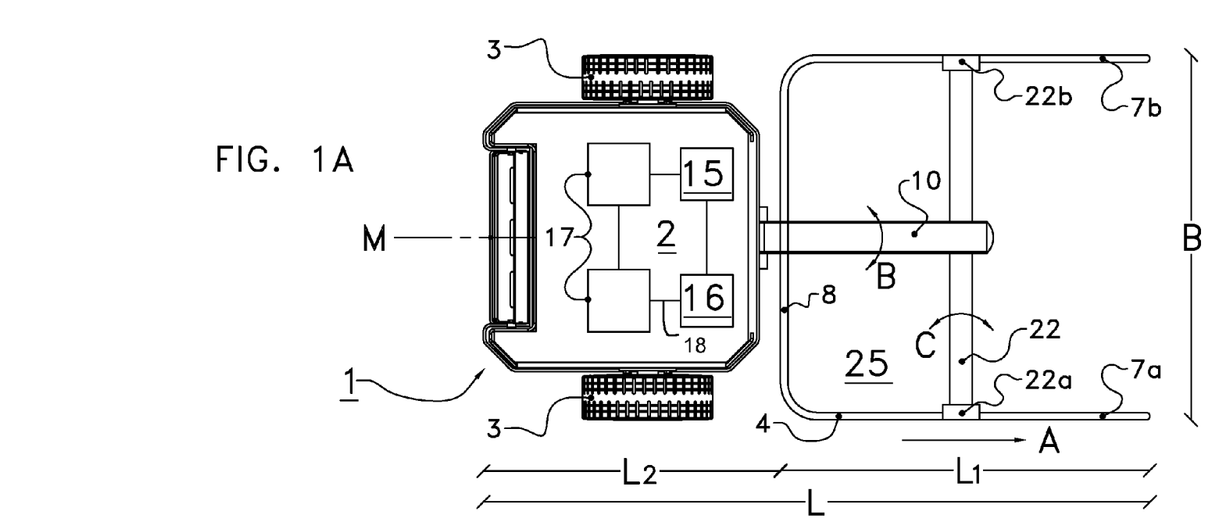
FIGS. 1A and 1B show a top and a side view a device for removing material present on a floor according to one embodiment of the invention.
Figure 1B:
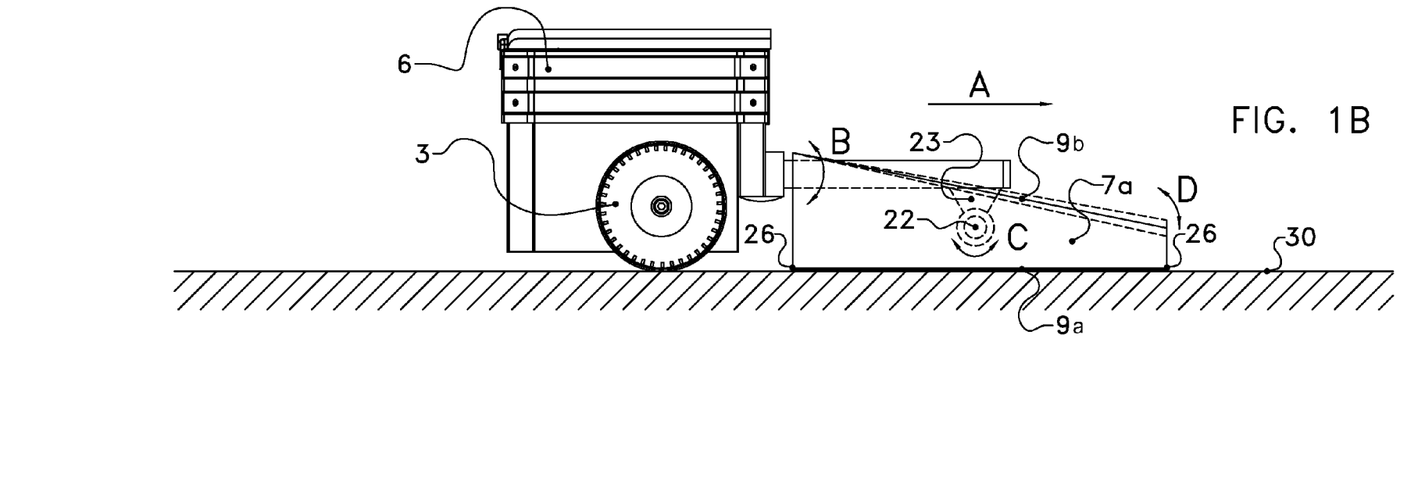

The following is a description of certain embodiments of the invention, given by way of example only and with reference to the drawings. Referring to FIG. 1: the device 1 shown in FIGS. 1A and 1B for removing manure from a floor 30 of a passageway of a stable comprises a relatively heavy, block-shaped concrete housing 2. The device 1 is supported on two wheels 3 and on a manure slide or scraper 4. The housing 2 is provided on both sides with current collectors 6, by means of which an accumulator 16, included in the housing 2, can be charged at an external charging station, as used in the manure slide device which is offered by Lely (registered trademark) under the name Discovery (registered trademark). The manure slide 4 is wholly located in front of the housing 2 and thus in front of the drive, as is visible in FIGS. 1A and 1B, and viewed in projection on a central longitudinal plane M of the device 1.

The housing 2 accommodates a control unit 15 which is fed by the accumulator 16 and which controls, via the control line 18, a double electric motor 17, by means of which the wheels 3 can be driven individually. The control unit 15 is capable of being programmed remotely, so that the device 1 can follow autonomously a defined working route, in a repeating manner.

The manure slide 4 is made of stainless steel and U-shaped with two legs 7a,b and a manure-pushing rear wall 8 oriented in forward direction of travel, which define a manure-accommodating-space 25, with a length L1 and a width B, which are substantially equal in this example. The legs 7a,b and the rear wall 8 are plate-shaped, the height of the legs 7a,b being greater at the rear than at the front. At their lower edge 9a they are provided with a polyurethane strip 26, for a sweeping contact with the floor 30. The legs 7a,b can undergo some mutual upward/downward movement (direction C), so that their lower edges can properly follow the floor 30.

A longitudinal bar 10, which is bearing-supported in a freely rotatable manner, direction B, about its centre line in the housing 2, extends forwardly from the housing 2. At the front end of the longitudinal bar 10 there is mounted a bracket 23 in which a cross-bar 22 is bearing-supported in a freely rotatable manner, direction C. The ends 22a,b of the cross-bar 22 are rigidly attached to legs 7a,b of the manure slide 4, thus behind the front end of the (legs) of the manure slide. As a result of this cardan-like connection with the housing 2, it is possible for the manure slide 4 to follow in a proper manner slopes in longitudinal and transverse direction of the floor 30, so that the contact of the manure slide 4 with the wall 30 remains sufficient. The rotational centre lines for the longitudinal bar 10 and for the cross-bar 22 are located below the highest point of the upper edge 9b of the rear wall 8, the rotational centre line for the cross-bar 22 even below the upper edges of all walls 7,8.

During operation on a so-called closed floor 30 of the passageway of a stable, it is possible by means of the device 1 moving in forward direction A to move in an autonomous manner manure (or other material) present on the floor 30 to a manure pit opening located at the end of the passageway. The device 1 subsequently moves back to the other end of the passageway, to start a next stroke, for sweeping a strip of the floor 30 next to the strip that was swept in the previous stroke.

By way of example, L1 is greater than L2, the length of the housing 2 upto the wall 8. L1 can amount to more than ⅔ of the sum of L1+L2, the overall length L of the device 1. L1 and B can, for example, amount to 1 m, whereby an amount of manure of 100 l can be accommodated without problems, which amount of manure is expected to land, in one hour, on a strip of 1 m of a passageway with a length of 100 m. In that case, the device 1 has to clean the same surface only 1× per hour. Then, L2 can amount to 0.5 m.

Figure 2A:
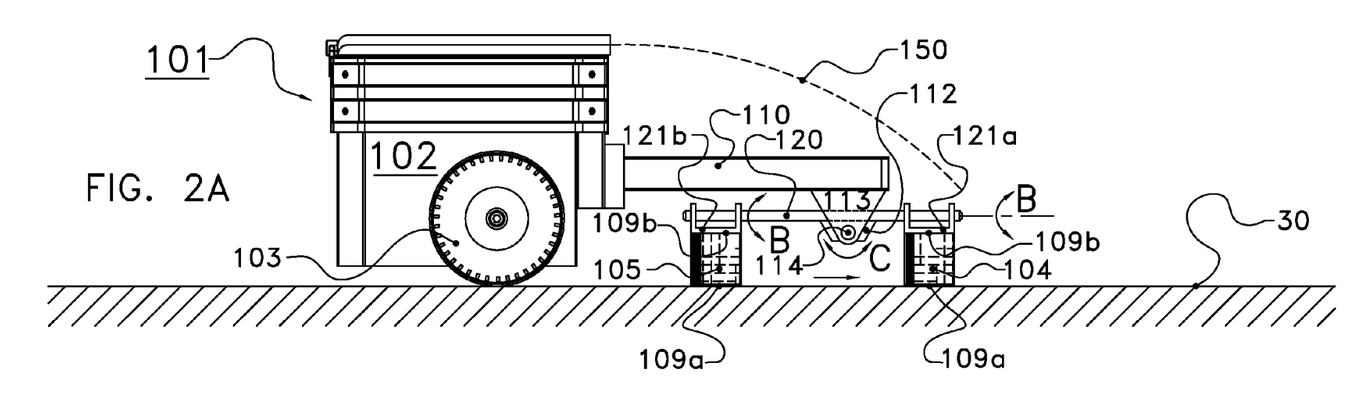
FIGS. 2A and 2B show a top and a side view of a device for removing material present on a floor according to one embodiment of the invention.
Figure 2B:
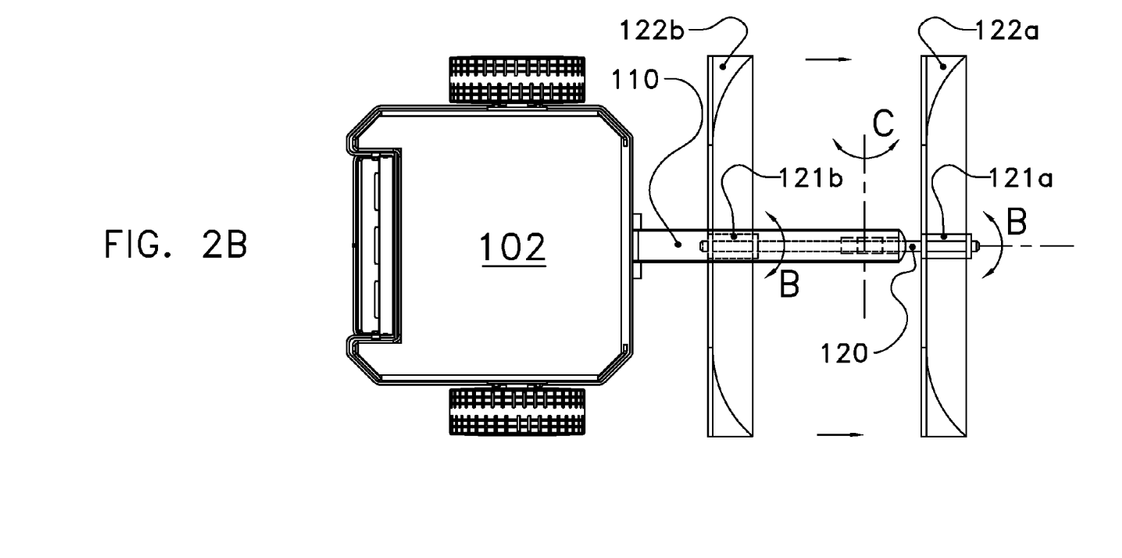

The device 101 shown in FIGS. 2A and 2B corresponds, as regards the housing 2 and the drive, to the device 1 of FIGS. 1A and 1B. The manure slide 104, located under a hood 150, now forms part of a tandem arrangement with two floor-treating members, thus, in addition to the first floor-treating member, the manure slide 104, a second sweeping floor-treating member 105, which can be designed as a manure slide, in this example, or as a brush, see the examples below. The device 101 is supported on two wheels 103 and on the two floor-treating members 104,105.

Each manure slide 104,105 has its mouth oriented concavely forwardly and has a lower edge 109a with polyurethane strip and an upper edge 109b. The manure slide 104,105 is fixed to a transverse plate 122a,b, which is fixed itself to a U-shaped holder 121a,b, which is rotatably mounted (direction C) on a central bar 120 which extends in longitudinal direction. The bar 120 is provided with a downwardly extending plate 112 which is bearing-supported by means of a pivot pin 114 in a fork 113 which is mounted on the front end of a bar 110 fastened to the housing 102. The pivot pin 114 has its centre line, which is transverse to the direction A, located below the upper edge 109b of the manure slides 104,105 and allows rotation of the bar 120 in the direction B, so that also in this embodiment a rotation about two horizontal centre lines which are perpendicular to each other is possible, each manure slide 104,105 individually in direction B and together in direction C, one upwards and the other downwards.

In this example, the pivot pin 114 is located behind the front slide 104, at a distance of approximately ⅓ of the intermediate distance between the slides 104 and 105. The location of the slides 104,105 with respect to the pivot pin 114 can be set. This is possible, for example, by making the connection between the holders 121a,b and the bar 120 adjustable, whereby, possibly, the mutual distance between the slides 104,105 can also be set. This can also be done, for example, by extending the plate 112 in longitudinal direction and to provide same with a plurality of apertures for the pin 114.

In an alternative embodiment, the bar 120 is located at a lower level, so that it is located below the upper edges 109b. The ends of the bar 120 can then be connected, relatively rotatably about its centre line, to the slides 104,105.

Figure 3A:
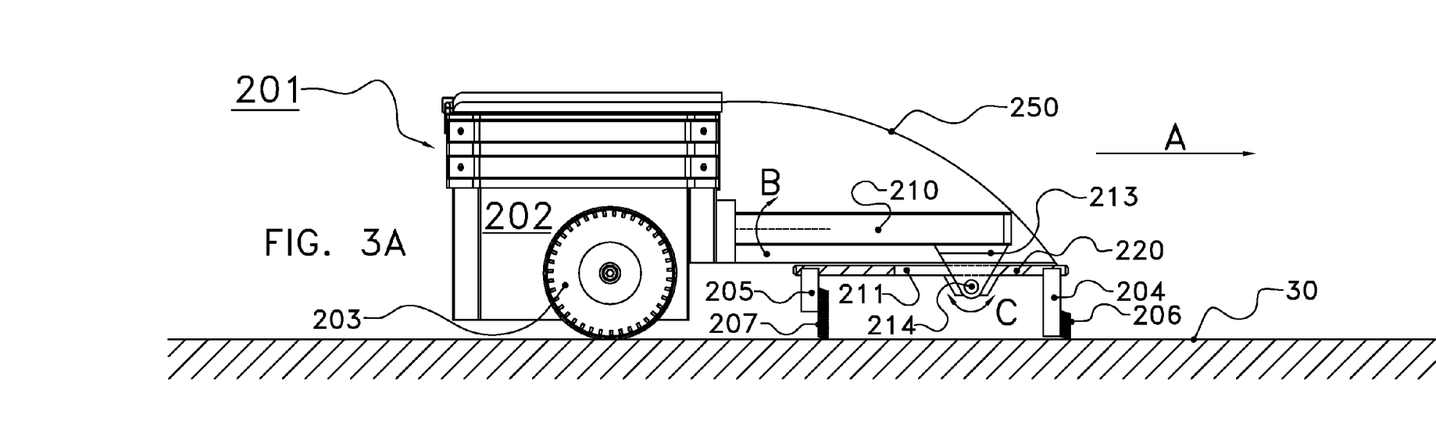
FIGS. 3A and 3B show a top and a side view of a device for removing material present on a floor according to one embodiment of the invention.
Figure 3B:
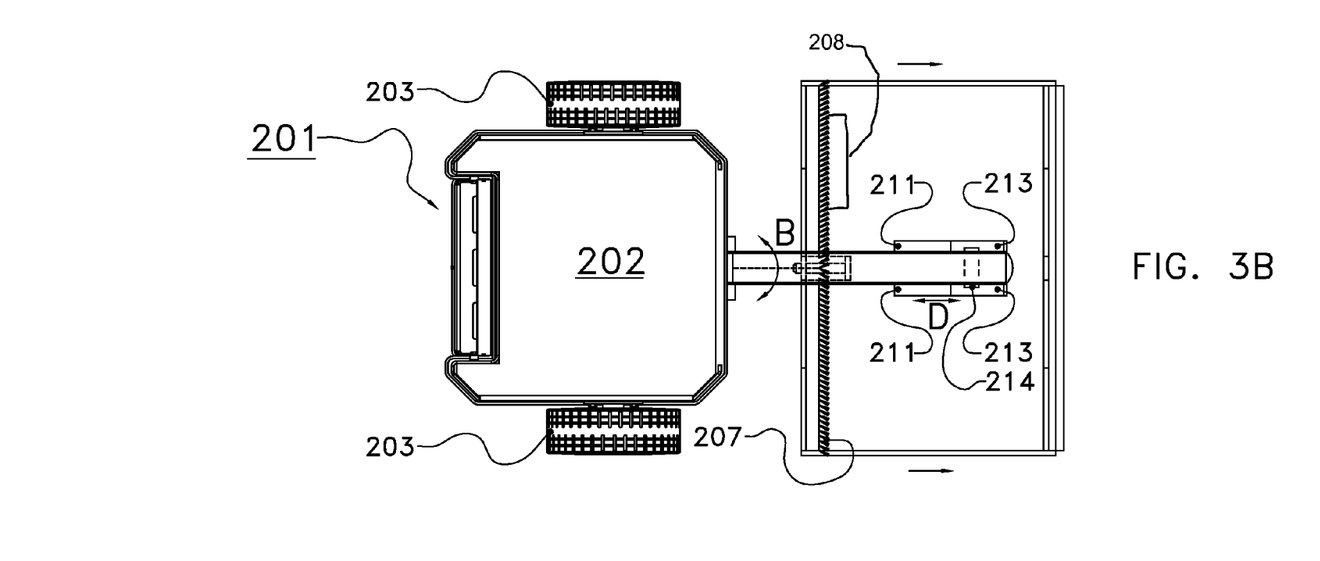

The device 201 shown in FIGS. 3A and 3B corresponds, as regards the housing 2 and the drive, to the device 1 of FIGS. 1A and 1B. The manure slide 204 provided with a sweeping strip 206 of synthetic material (first floor-treating member), located under a hood 250, now forms part of a rigid arrangement with a second sweeping support member 205 (second floor-treating member) which is designed as a fixed brush 207, for example with nylon bristles 208. The device 201 is supported on two wheels 203 and on the two floor-treating members 204,205.

The two members 204,205 are fixed to a plate 220 of stainless steel and form therewith a rigid unit. The plate 220 is provided with two slots 211 for passing the two plates of a fork 213 which is fixed to the front end of a horizontal bar 210 which projects from the front of the housing 202 and which is bearing-supported in a manner in which it is rotatable about its centre line (direction B). By a pivot pin 214 located below the plate 220, the fork 213 is attached rotatably, in the direction C, to a downwardly extending plate 212 which is fastened to the lower side of the plate 220, so that the plate 220 with the members 204,205 can tilt in that direction. If desired, the slots 211 can be extended in order to set displacement of the position of the pivot pin 214 with respect to the members 204,205, in which case locking means will be provided for this purpose. The pivot pin 214 can then be located closer to the front member 204 than to the rear member 205.

Figure 4A:
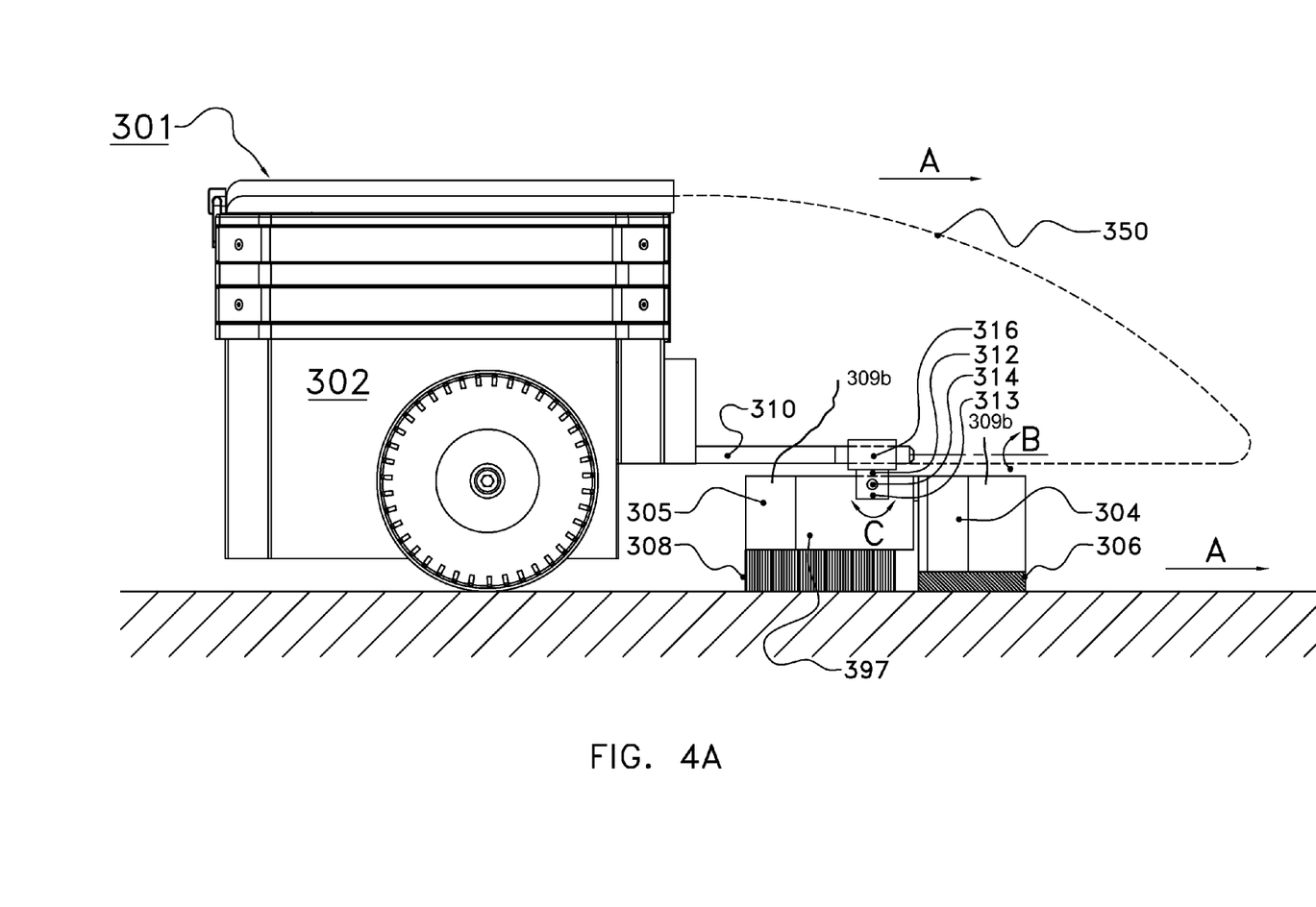
FIGS. 4A and 4B show a top and a side view, respectively, of a device for removing material present on a floor according to one embodiment of the invention.
Figure 4B:
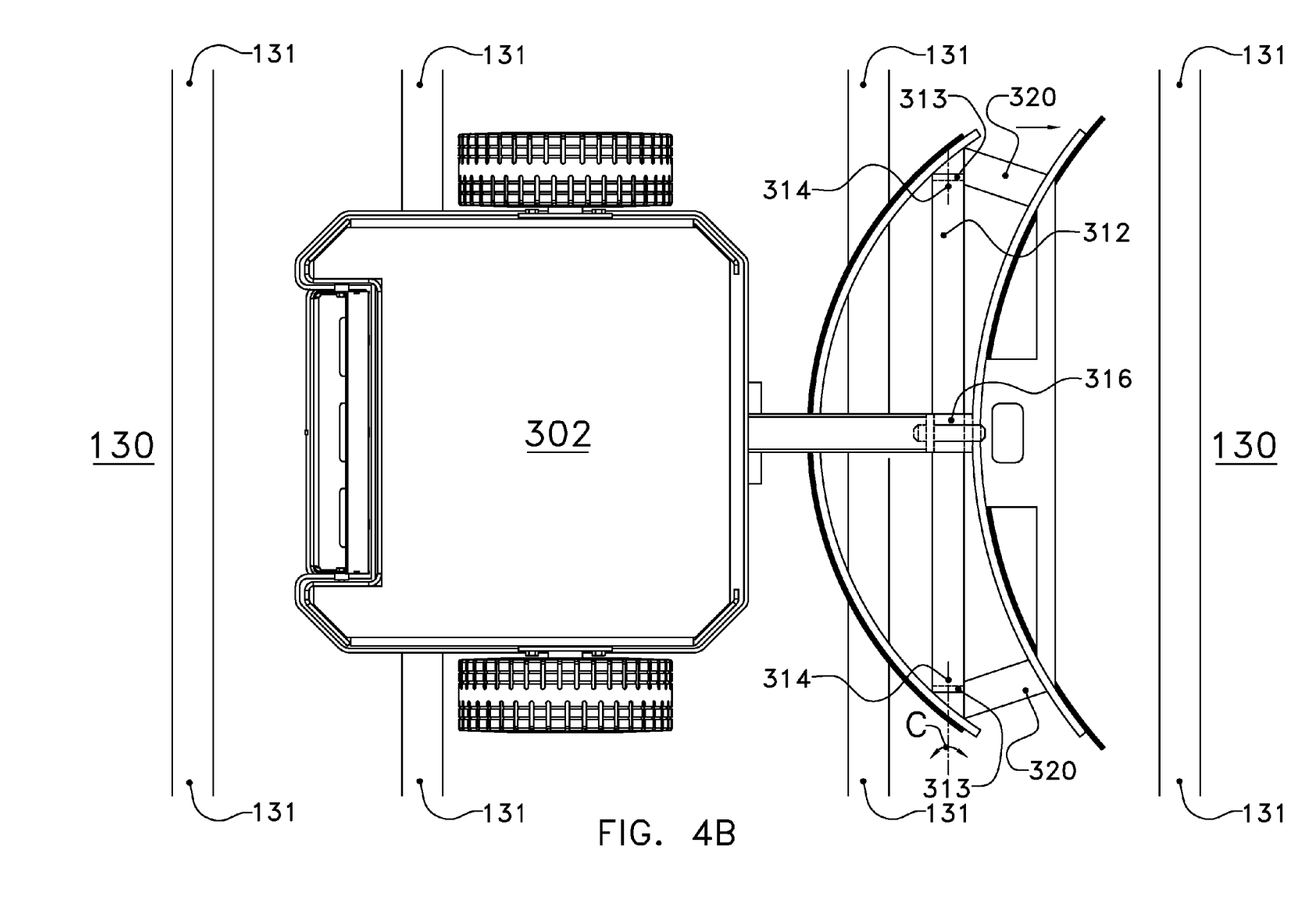

The device 301 shown in FIGS. 4A and 4B corresponds, as regards the housing 2 and the drive, to the device 1 of FIGS. 1A and 1B. The manure slide 304, provided with a sweeping strip 306 of synthetic material, located under a hood 350, forms again part of a rigid arrangement with a second sweeping support member 305 which is designed as a fixed brush 397, for example with nylon bristles 308. The device 301 is supported on two wheels 303 and on the two floor-treating members 304,305.

The members 304,305 are concave and have their opening oriented forwardly, and are interconnected near the lateral sides of the 301 by plates 320, so as to form a rigid unit, when viewed in a vertical longitudinal plane and a vertical plane perpendicular thereto, which, by means of a bearing bush or bearing case 316, rotatably about a substantially horizontal rotational centre line (direction B) is fastened to the front end of a longitudinal girder 310 which is rigidly attached to the housing 302. By the rigid arrangement undesired tilting as a result of wear in bearing bush 316 is counteracted. Near the lateral sides of the device 301, the support member 305 provided with a brush is fastened to downwardly bent ends 313 of a transverse strip 312 fastened to the bearing bush 316, i.e. rotatably about pins 314 in direction C. The pins 314 are located below the upper edges 309b of the members 304,305.

Figure 5A:
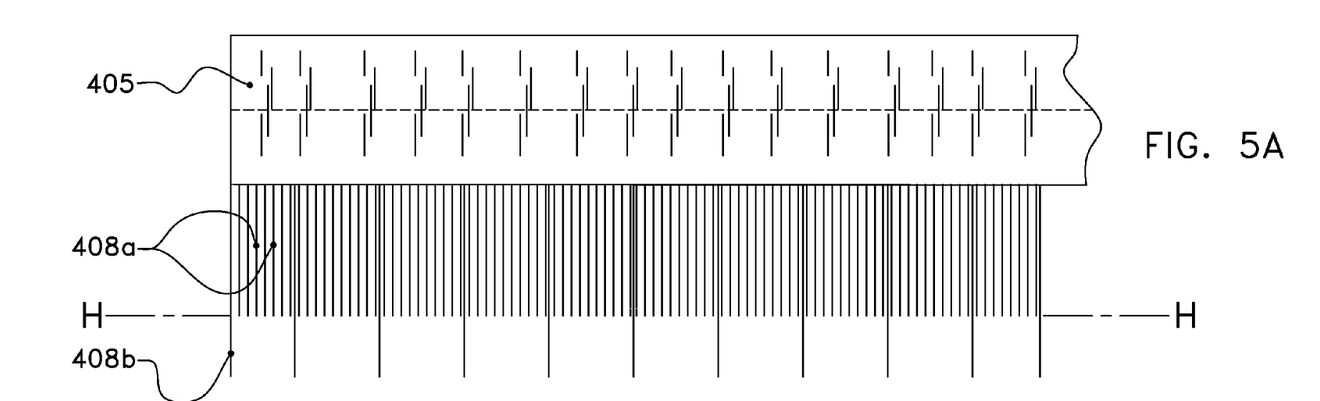
FIGS. 5A and 5B show a detail of a view of a brush adapted for use in a device according to the invention, in unloaded condition, and a view of a situation during use, respectively.

For use on a so-called slatted floor, in an embodiment with transverse slots vertically throughgoing to the manure pit located therebelow, schematically indicated in FIGS. 4A and 4B as a floor 130 with transverse slots 131, in the devices 201 and 301 use can be made of a fixed brush 407 with bristles 408a and 408b of different lengths, which are fixed at their upper ends in the member 405, which has for this purpose, for example, an inversed U-profile for receiving these upper ends with glue. The length of the bristles 408b is greater (for example 1.5 cm or more, for example 4 cm greater, than that of the bristles 408a. The bristles 408b are provided in smaller number, solitary or in small groups, at a regular distance from each other, in alternation with groups of shorter bristles 408a, see FIGS. 5A and 5B. For illustrative reasons, the bristles 408a,b are depicted in FIG. 5A as exaggeratedly thin ones. However, the bristles 408a,b are located in succession against each other. FIG. 5A shows the unloaded condition, indicating that the lower ends of the shorter bristles 408a are located in a horizontal plane H. During use, the plane H will coincide with the floor surface and the long bristles 408b will drag in bent condition over the floor. It is observed that these long bristles 408b, instead of with a brush, can also be combined with another sort of floor-treating member, in particular with a manure slide itself.

Figure 5B:
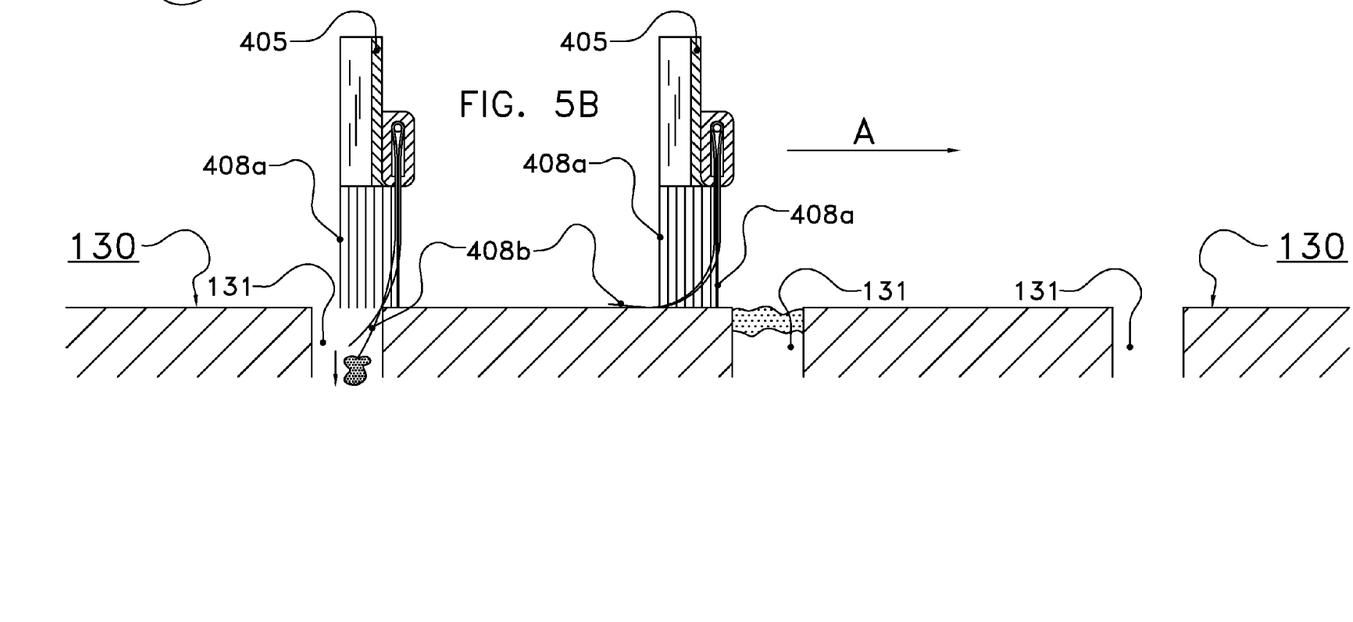

During operation, the lower ends of the bristles 408a push on the floor 130, in order to prevent possible film formation of spread-out manure which may occur at higher temperatures, or to break film which has been formed. The longer bristles 408b are then dragged, in bent condition. As soon as the longer bristles 408b arrive above a slot 131, they can bend into it with force, in which case they detach possible manure residues from the opening of the slot and/or push downwards and clear the opening again. They are automatically bent upwards again by the edge of the opening of the slot.

The shape of the series of bristles 408a,b, which is curved in this example, can result in parts that are in an oblique position with respect to the direction A in that the movement of the long bristles 408b to the curved position and back is affected by adjacent bristles, in such a manner that said movement will obtain a directional component transverse to the direction A. As a result thereof, the long bristles will also undergo a displacement in the direction of the slot, so that the clearing effect will be increased.

The space between the manure slide and support member, such as brush, both shown in FIGS. 2A,B, 3A,B and 4A,B, can be used for exerting influence on the floor, for example by spraying. Said space can, for example, also be used for installing long bristles, which extend below the horizontal plane defined by the lower edge of the manure slide and/or brush, in order, as described above, to be able to move downwards at the location of the slots in the floor in order to detach manure from the slots.

The above-mentioned description serves to illustrate the operation of preferred embodiments of the invention, and not to limit the scope of the invention. On the basis of the above-mentioned explanation, it will be obvious for a person skilled in the art that there are many variations falling within the spirit and scope of the present invention.

The invention claimed is:

1. A device for removing manure present on a floor, comprising a frame, a drive for moving the device over the floor, and at least one manure slide having an upper edge, wherein the manure slide is held to the frame by a connection structure, wherein the connection structure comprises a first rotational connection with a first substantially horizontal rotational centre line that is located below at least a portion of the upper edge of a manure-pushing wall portion of the manure slide, and a second rotational connection with a second, substantially horizontal rotational centre line which is at least one of: at an angle to the first rotational centre line, and 90 degrees to the first rotational centre line.

2. The device according to claim 1, wherein the second rotational centre line is located below at least a portion of the upper edge of a manure-pushing wall portion of the manure slide.

3. The device according to claim 1, wherein the first rotational centre line is substantially transverse to a vertical central longitudinal plane of the device.

4. The device according to claim 3, wherein the first rotational centre line is located behind the manure slide.

5. The device according to claim 4, wherein the manure slide is mounted on a holder, and is with respect to the frame movable therewith as a unit about the first and, optionally, the second rotational centre line, wherein the holder comprises an added floor-treating member located in longitudinal direction at a distance from the manure slide.

6. The device according to claim 5, wherein the manure slide and the added floor-treating member are located on both sides of the first rotational centre line.

7. The device according to claim 6, wherein the horizontal distance, when viewed in the longitudinal direction to the first rotational line is settable for at least one of the manure slide and the added floor-treating member.

8. The device according to claim 7, wherein the setting is done by the position of the holder with respect to the frame.

9. The device according to claim 7, wherein the manure slide comprises front floor contact points that, when viewed in longitudinal direction, are located closer to the first rotational centre line than the rear floor contact points of the added floor-treating member.

10. The device according to claim 9, wherein the ratio of the distances in longitudinal direction between the front floor contact points of the manure slide and the first rotational centre line and the rear floor contact points of the added floor-treating member and the first rotational centre line amounts to approximately 1 to 2.

11. The device according to claim 5, wherein the manure slide, the holder and the added floor-treating member, when viewed in a vertical longitudinal plane of the device, form a rigid unit.

12. The device according to claim 5, wherein the manure slide and the added floor-treating member are rotatable with respect to each other about a rotational centre line which extends parallel to the longitudinal direction.

13. The device according to claim 12, wherein the said rotational centre line is the second rotational centre line.

14. The device according to claim 5, wherein the added floor-treating member forms an upright strip that extends substantially in transverse direction and has a sweeping function.

15. The device according to claim 5, wherein at least one of: the holder is plate shaped, and the holder comprises an added floor-treating member located behind the manure slide.

16. The device according to claim 5, wherein at least one of: the manure slide and the added floor-treating member is concave.

17. The device according to claim 16, wherein at least one of the manure slide and the added floor-treating member have a hollow side oriented forwardly.

18. The device according to claim 1, wherein the second rotational centre line is located in a vertical central longitudinal plane of the device.

19. The device according to claim 1, wherein at least one of: the location of the manure slide, and the horizontal distance with respect to the first rotational centre line is settable.

20. The device according to claim 1, wherein the manure slide is substantially U-shaped or V-shaped in order to define a manure-accommodating-space that opens in a forward direction.

21. The device according to claim 20, wherein, when viewed in projection on a vertical central longitudinal plane of the device, the first rotational centre line at least one of: located in front of a rear wall of the manure-accommodating-space and coincides in horizontal direction with the manure-accommodating-space.

22. The device according to claim 21, wherein the manure slide has two legs that have a length in the order of magnitude of the width of the rear wall of the manure slide.

23. The device according to claim 1, wherein the device is at least one of unmanned, self-propelling, and self-steering.

24. A device for removing material from a stable floor, wherein the device comprises a frame and a slide for the material, wherein the slide is connected to the frame and has a lower edge for sliding contact with the stable floor, wherein the lower edge is located in a first horizontal plane, wherein the device further comprises a brush with a series of stationary brush bristles that are juxtaposed substantially in transverse direction, wherein the brush comprises brush bristles of at least two different lengths, wherein longer brush bristles are bendable and extend further downwards than shorter brush bristles, up to a distance below the first horizontal plane, wherein the shorter brush bristles have their ends located in or near the first horizontal plane.

25. The device according to claim 24, wherein the device is at least one of unmanned, self-propelling, and self-steering.

26. A device for removing material, such as manure, present on a floor, comprising a frame, a drive for moving the device over the floor and at least one manure slide that has an upper edge, wherein the manure slide is held to the frame by a connection structure, wherein the connection structure comprises a first rotational connection with a first substantially horizontal rotational centre line which is located behind the manure slide, and a second rotational connection with a second, substantially horizontal rotational centre line which is at least one of: at an angle to the first rotational centre line, and 90 degrees to the first rotational centre line.

27. The device according to claim 26, wherein the first rotational centre line is located below at least a portion of the upper edge of a manure-pushing wall portion of the manure slide.

28. The device according to claim 26, wherein the device is at least one of unmanned, self-propelling, and self-steering.

29. Assembly of an at least one of unmanned, self-propelling, and self-steering device, wherein the device is configured for removing manure present on a floor, comprising a frame, a drive for moving the device over the floor and at least one manure slide having an upper edge and a floor,
  wherein the manure slide is held by the frame by a connection structure,
  wherein the connection structure comprises a first rotational connection with a first substantially horizontal rotational centre line that is located below at least a portion of the upper edge of a manure-pushing wall portion of the manure slide, and a second rotational connection with a second, substantially horizontal rotational centre line which is at least one of: at an angle to the first rotational centre line, and 90 degrees to the first rotational centre line.

30. The assembly according to claim 29, wherein the floor has a closed upper surface.

31. The assembly according to claim 29 wherein the floor forms a slatted floor with transverse slots.

32. The assembly according to claim 29, wherein the floor forms a passageway in a stable.

33. A stable provided with the assembly according to claim 29.

* * * * *